(12) United States Patent
Greenberg

(10) Patent No.: US 6,657,796 B2
(45) Date of Patent: Dec. 2, 2003

(54) VARIABLE-SIZE SECTOR-SHAPED APERTURE MASK AND METHOD OF USING SAME TO CREATE FOCAL PLANE-SPECIFIC IMAGES

(76) Inventor: Gary Greenberg, 520 Washington Blvd., #422, Marina Del Rey, CA (US) 90292

( * ) Notice: Subject to any disclaimer, the term of this patent is extended or adjusted under 35 U.S.C. 154(b) by 0 days.

(21) Appl. No.: 09/552,181

(22) Filed: Apr. 18, 2000

(65) Prior Publication Data

US 2002/0159167 A1 Oct. 31, 2002

(51) Int. Cl.⁷ .......................... G02B 3/00; G02B 21/22; G02B 21/06
(52) U.S. Cl. ...................... 359/738; 359/739; 359/377; 359/385
(58) Field of Search ................... 359/738, 376, 359/377, 385, 739, 740

(56) References Cited

U.S. PATENT DOCUMENTS

| | | | | |
|---|---|---|---|---|
| 4,413,889 A | * | 11/1983 | Taira | 359/362 |
| 5,345,333 A | * | 9/1994 | Greenberg | 359/389 |
| 5,440,426 A | * | 8/1995 | Sandstrom | 359/559 |
| 5,706,128 A | * | 1/1998 | Greenberg | 359/385 |
| 5,831,736 A | | 11/1998 | Lichtman et al. | 356/613 |
| 5,867,309 A | | 2/1999 | Spink et al. | 359/377 |
| 5,969,853 A | | 10/1999 | Takaoka | 359/370 |
| 2002/0027724 A1 | * | 3/2002 | Greenberg | 359/738 |
| 2002/0159167 A1 | * | 10/2002 | Greenberg | 359/738 |

* cited by examiner

*Primary Examiner*—David N. Spector
(74) *Attorney, Agent, or Firm*—H. Michael Brucker

(57) ABSTRACT

A variable size sector-shaped aperture mask used in an optical imaging system, such as a microscope, increases contrast and depth of field without loss of resolution and permits different angled views of an object to be captured and compared to create focal plane-specific images.

16 Claims, 4 Drawing Sheets

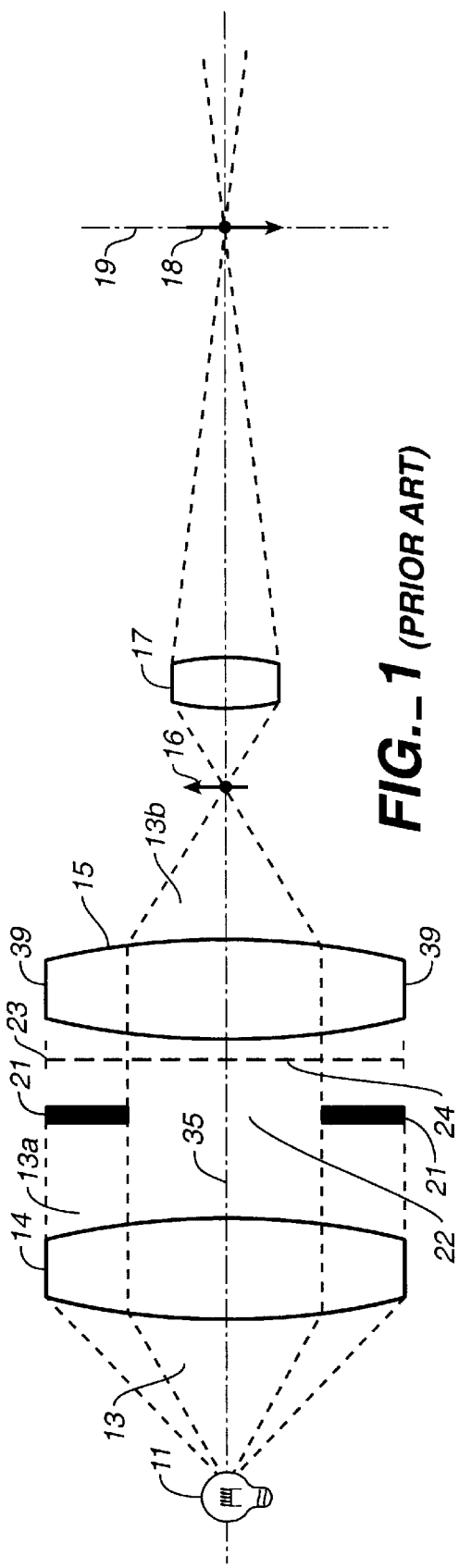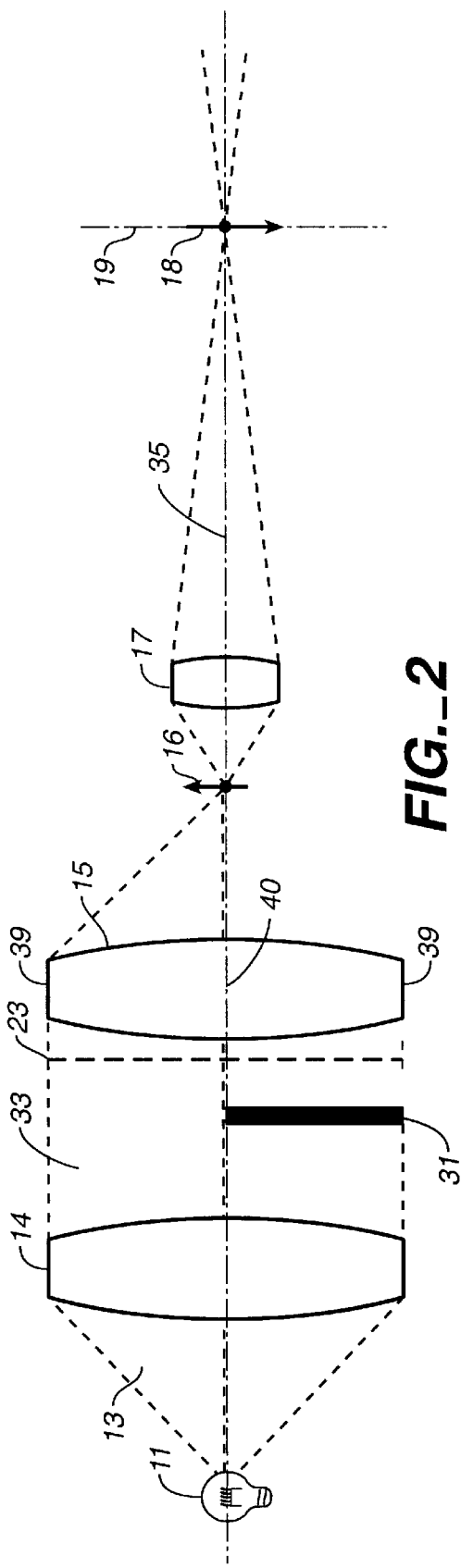

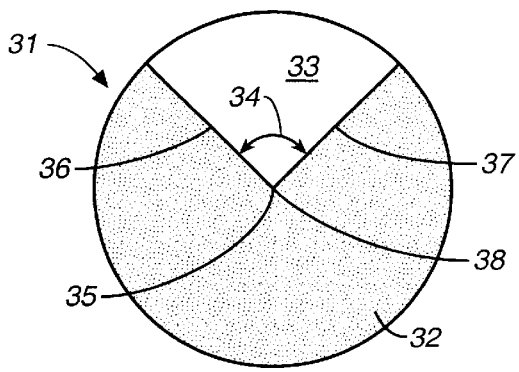
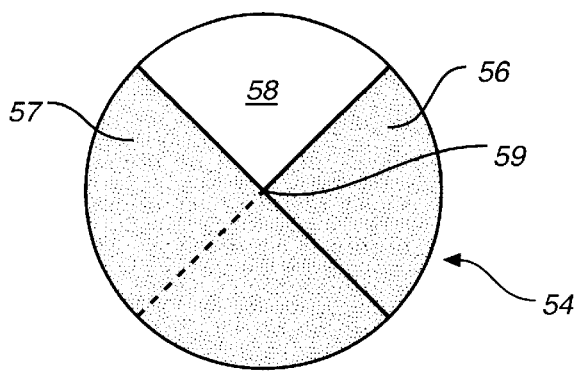
FIG._3  FIG._7
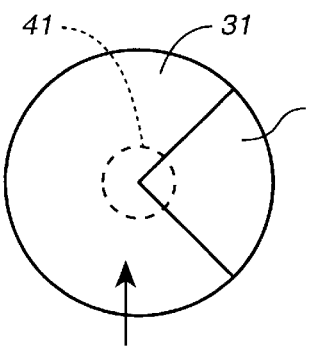 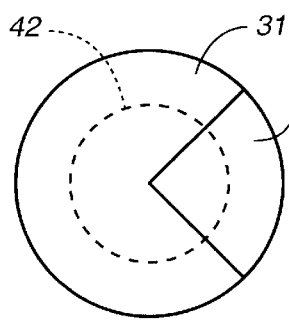 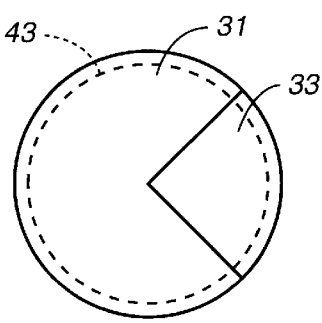
FIG._4a  FIG._4b  FIG._4c
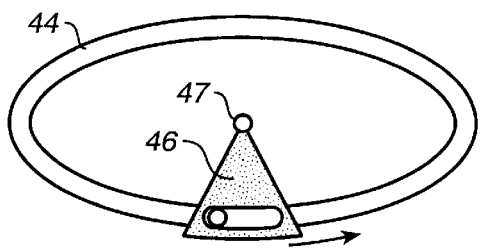
FIG._5a
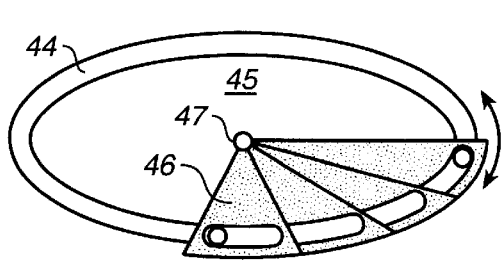 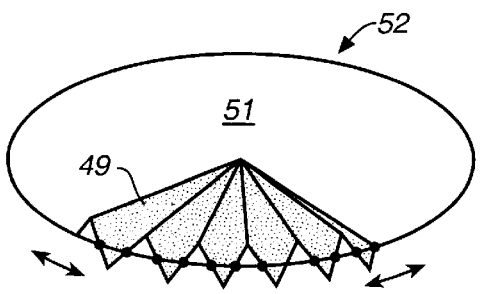
FIG._5b  FIG._6

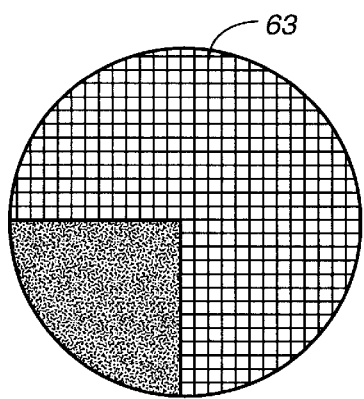
FIG._8
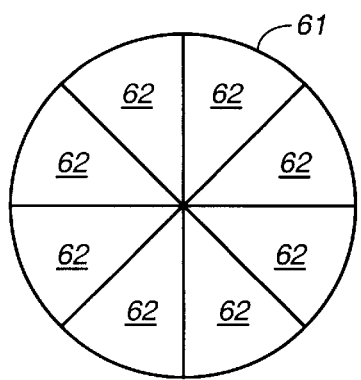
FIG._8a
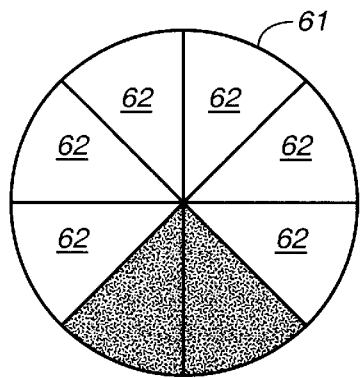
FIG._8b
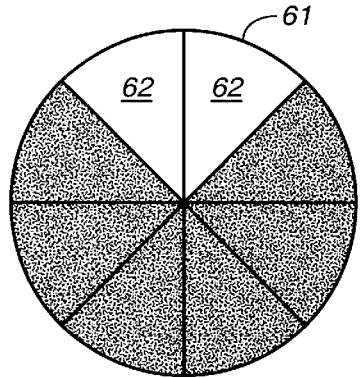
FIG._8c
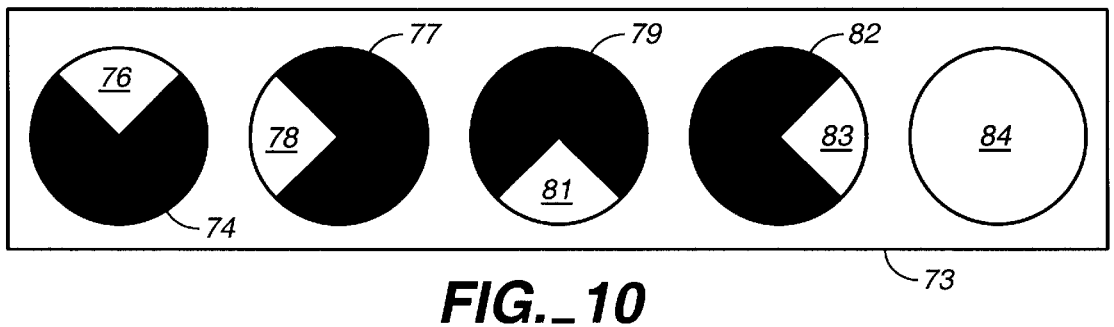
FIG._10

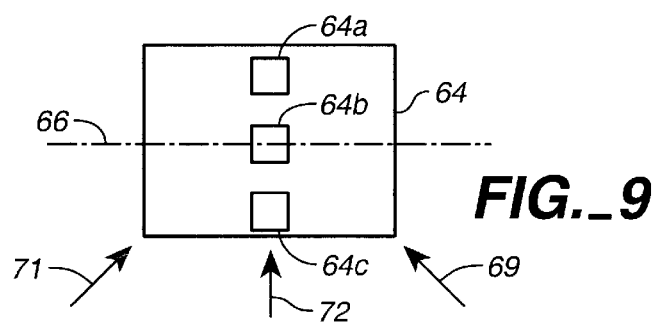
FIG._9
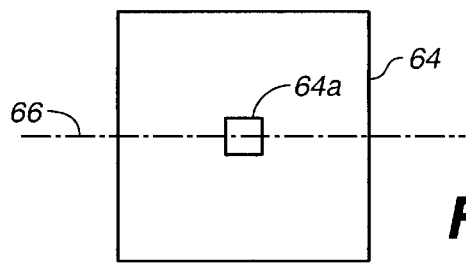
FIG._9a
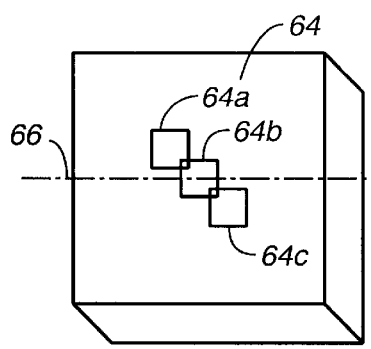
FIG._9b
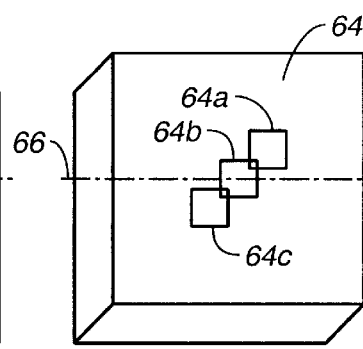
FIG._9c
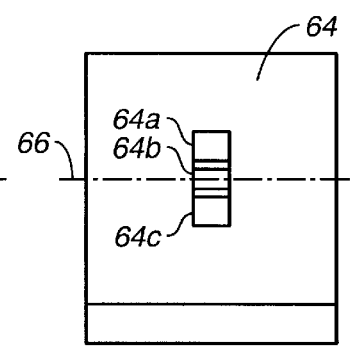
FIG._9d
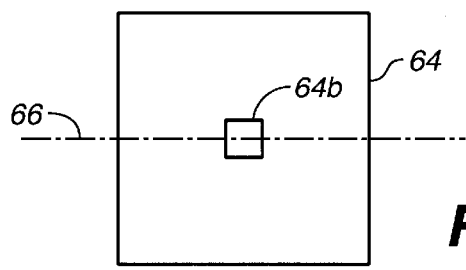
FIG._9e

VARIABLE-SIZE SECTOR-SHAPED APERTURE MASK AND METHOD OF USING SAME TO CREATE FOCAL PLANE-SPECIFIC IMAGES

FIELD OF THE INVENTION

The present invention is useful in optical systems, and in particular, in optical systems that create a perceivable image of an object by the transmission of radiation through a lens. While not so limited, the present invention has particular application to light microscopes that use an iris diaphragm to enhance certain characteristics of the image created in the microscope.

BACKGROUND OF THE RELATED ART

A standard element of almost all modem light microscopes is a variable diameter (diaphragm) iris disposed at the aperture of the objective lens or at a plane conjugate to the objective aperture to control the area of the lens that passes light. As used herein, the term "objective aperture" shall mean, and will be understood by those skilled in the art to be, a lens aperture (or back focal plane) or any aperture conjugate to a lens aperture.

By effectively decreasing the area (diameter) of the lens that passes light by closing down the iris diaphragm, the contrast and depth of field of the perceived image is increased, while light intensity and resolution are decreased. Iris diaphragms used for the foregoing purpose have not changed materially for many decades. Investigators using a microscope with such an iris are able to adjust the iris to obtain the best combination of contrast, depth of field and resolution for the particular investigation being conducted.

The degradation of resolution by increasing contrast and depth of field with an iris diaphragm is a result of the iris blocking light from the outer portions of the lens, thereby reducing the working numerical aperture (NA) of the lens and hence reducing the higher order image-forming wavelets that pass through the lens. This phenomenon is explained in detail in Dr. Greenberg's U.S. Pat. No. 5,345,333.

SUMMARY OF THE INVENTION

The present invention provides an aperture mask for an image-forming lens that not only increases image contrast and depth of field, but does so without compromising image resolution. In some directions of observation, the image resolution is even increased, along with increased contrast and depth of field. In addition, the aperture mask produces highlights and shadows of structures within the object being observed, producing an image with enhanced definition.

While the invention is described, for the most part, with reference to light microscopes, it will be immediately recognized by those skilled in the art that the invention is useful in any optical system in which radiation is transmitted through a lens to form an image of an object to be perceived by the human eye or some other detection system.

Rather than using a mask having a circular, co-axial, variable-diameter aperture, as taught by the prior art, the present invention teaches the use of a mask aperture in the shape of a variable-size sector of a circle (wedge-shaped), with the vertex of the sector at the lens optical axis and its two defining sides which diverge from the vertex extending to or beyond the periphery of the lens (and thus, the lens aperture). The sector-shaped mask aperture with its vertex at the lens optical axis permits transmission of light through a portion of the objective lens that includes the center of the lens and its periphery so that the higher order image-forming wavelets that would be transmitted by the unmasked lens are included in the perceived image formed with the masked lens, thereby eliminating the cause of resolution degradation. By varying the angle between the defining sides of the sector-shaped aperture, the size of the aperture and the shape of the beam of light that is transmitted through the lens aperture is varied, thereby varying contrast and depth of field. The variability of the aperture permits the operator to finely tune the system to create the best match between the object under investigation and the optical system imaging that object.

The terms "sector" or "sector of a circle" are used herein to mean that portion of a circle which includes an arc of the circle and the center of the circle. The terms "aperture" or "opening," as used herein, mean light transmissive, as opposed to opaque, and do not necessarily mean without physical structure.

Because of the particular geometry of a sector of a circle, a mask having a variable-size, sector-shaped aperture can be used with lenses of different numerical apertures and magnifications.

Another advantage of the present invention is that the light beam which passes through the lens through the sector-shaped aperture of the mask is oblique with reference to the optical axis of the lens, thus having functional capabilities well beyond those of a co-axial beam emanating from a standard prior art circular, co-axial, variable-diaphragm iris.

By positioning the sector-shaped aperture of the mask of the present invention at different locations about the optical axis of the objective lens, the object is viewed from different directions or oblique angles relative to the optical axis. The degree of obliquity is further controlled by the angular opening of the sector-shaped aperture. For example, a 90-degree sector will produce a greater angle of obliquity than a 180-degree sector. By so observing an object from different directions, it is possible to differentiate between those elements of the image of the object that are at the focal plane of the lens and those that are above and below the focal plane. As the image of the object is viewed from different directions by changing the angular orientation of the sector-shaped aperture, those elements of the image that are above and below the focal plane appear to change their location relative to the frame of the image, while those elements of the image of the object which are at the focal plane remain stationary. It being well within the art to select out those elements of the image that change their location from those that do not, it is possible, using the present invention, to obtain a focal plane-specific image. By changing the location of the focal plane within the object. It is possible to achieve a number of focal plane-specific images of the object, and from those images, construct a 3-D model of the object in a manner well known to those skilled in the art of confocal microscopes.

Accordingly, it is an object of the present invention to provide a new and improved aperture mask for a lens to increase the contrast, definition and depth of field of an image of an object without decreasing resolution.

It is a further object of the present invention to provide an improved aperture mask for a lens which permits the object to be viewed from different angles of view.

It is another object of the present invention to utilize a sector-shaped mask aperture in a microscope having an objective lens to obtain a plurality of focal plane-specific images of an object from which can be constructed a 3-D model of the object.

Another object of the invention is to provide an improved and universal mask that functions equally with lenses of different numerical apertures and magnifications.

Other advantages and objects of the invention will be apparent to those skilled in the art from the description of the invention which follows with reference to the following drawings.

BRIEF DESCRIPTION OF THE DRAWINGS

FIG. 1 is a schematic side view of a typical microscope objective lens with a prior art iris;

FIG. 2 is a schematic side view of a typical microscope objective with the mask of the present invention in place of the iris;

FIG. 3 is a plan view of the mask of the present invention;

FIG. 4a is a plan view of a mask of the present invention in relationship to a lens of small NA;

FIG. 4b is a plan view of a mask of the present invention in relationship to a lens of medium NA;

FIG. 4c is a plan view of a mask of the present invention in relationship to a lens of high NA;

FIG. 5a illustrates an embodiment of the invention using overlapping sector-shaped leaves;

FIG. 5b illustrates an embodiment of the invention using expanded sector-shaped leaves;

FIG. 6 is an embodiment of the invention using an expandable bellows;

FIG. 7 is an illustration of an embodiment of the invention using semi-circular, opaque overlapping members;

FIG. 8 is an illustration of an embodiment of the invention utilizing an array of LCDs;

FIG. 8a is an illustration of an embodiment of the invention using sector-shaped LCDs;

FIG. 8b is the embodiment of FIG. 8a with selected LCD's rendered opaque;

FIG. 8c is the embodiment of FIG. 8a with other selected LCD's rendered opaque;

FIG. 9 is a schematic illustration of an object to be viewed, seen in side view;

FIG. 9a is the object of FIG. 9 as seen from a top view;

FIG. 9b is the object of FIG. 9 as seen from one angled view;

FIG. 9c is the object of FIG. 9 seen from a different angled view;

FIG. 9d is the object of FIG. 9 seen from still a different angled view;

FIG. 9e is a side view of the object of FIG. 9 showing only the elements at the focal plane;

FIG. 10 is a schematic view of an embodiment of the invention utilizing a slider.

DETAILED DESCRIPTION OF THE INVENTION

Referring to FIG. 1, a typical prior art lens-based radiation optical imaging system includes a lamp 11 which directs a light beam 13 onto a lamp condenser 14 which columnates the beam and directs it to a condenser lens 15 which focuses the beam 13 onto an object 16. Light from the illuminated object 16 travels to an objective lens 17 which forms an image 18 of the object at the intermediate image plane 19. Typically, an iris diaphragm 21 having a variable opening 22 is located at the plane 24 of rear aperture 23 of lens 15. For illustrative purposes, the iris diaphragm 21 is shown spaced apart from the lens rear aperture 23, where, in practice, the iris is, where possible, placed at the aperture. The aperture 23 represents the maximum opening available for the lens 15 to receive light (and thus, the lens' maximum NA). The iris diaphragm (mask) 21 effectively reduces the diameter of the aperture 23 (and thus, the effective NA of the lens) through which light passes to lens 15. By adjusting the diameter of mask aperture 22, the size of the central area of lens 15 that passes light is regulated. As the size of aperture 22 is decreased, the contrast and depth of field of image 18 increases, whereas its resolution decreases.

By placing the mask 21 (iris diaphragm) at the aperture plane 24, it is not detectable as an image at the image plane 19 where the image 18 is formed. When reference is made to a mask or other optical device being "at" an aperture plane, it shall mean, and will be understood by those skilled in the art, that the mask is at that proximity to a lens aperture plane that it is not imaged at an image plane. Thus, one viewing the image 18 at the intermediate image plane 19 or a plane conjugate to the intermediate image plane as the diameter of the mask aperture 22 is decreased, for example, would not observe that a smaller area of the lens 15 was being illuminated.

As light beam 13 emanates from lens 14, an annulus 13a of the beam is blocked by the mask 21 from entering the lens aperture 23, while the inner cylindrical portion 13b of the beam 13 passes through the mask aperture 22 to lens 15 which focuses the beam 13b onto the object 16. As the mask 21 is adjusted to increase or decrease its aperture 22, the extent to which the outer areas of the lens 15 are masked increases or decreases. However, for all adjustments of the mask aperture 22, the lens aperture 23 is reduced in diameter and some outer annulus of the lens 15 is prevented from receiving and transmitting light from the light source 11 to object 16. By preventing light from an outer annulus of the lens 15 from participating in the formation of the image 18, certain image-forming wavelets are lost, thus reducing the resolution of the image 18. See Greenberg U.S. Pat. No. 5,345,333.

Referring to FIGS. 2 and 3, the same basic optical imaging system as described above in which a condenser lens 15 and objective lens 17 form an image 18 of the object 16 at the intermediate image plane 19 includes a mask 31, instead of iris diaphragm 21, at the rear aperture 23 of lens 15. Rather than the mask 31 having an aperture that is coaxial with the aperture 23, the mask 31 is formed of an opaque material 32 having an aperture 33 in the shape of a sector of a circle with its vertex 38 at the lens optical axis 35. Because the mask aperture 33 is not coaxial with the optical axis 35, movement of the aperture 33 about the optical axis 35 creates different optical conditions. The angle 34 between the mask sector-forming sides 36 and 37 can be varied to increase or decrease the size of the aperture 33 with an attendant change in contrast, definition and depth of field. In the preferred embodiment, the sector-defining sides 36 and 37 extend to or beyond the periphery 39 of the lens 15 so that at least some portion of the lens 15 extending from its center 40 to its periphery 39 is exposed. Mask 31 is sized to occlude the entire lens aperture 23, except for the sector-shaped mask aperture 33.

Because the mask aperture 33 extends from the optical axis 35 (vertex 38) to or beyond the periphery 39 of lens 15, the higher order wavelets that form the image 18 that could have been received by the full, unobstructed aperture 23 of lens 15 can pass through aperture 33 and lens 15 and be included in forming the image 18. Accordingly, not only does the mask 31 of the present invention have the effect of increasing contrast, definition and depth of field, but it does so without decreasing the resolution of the image, and in some cases, can enhance the resolution.

In the present invention, the light beam 13 is blocked from lens aperture 23, except through the sector-shaped aperture 33, which, regardless of its size (angle 34), will include a portion of lens 15 extending from its center 40 to its periphery 39.

Because the aperture 33 in the mask 31 is asymmetrical about the optical axis 35, rotating the mask 31 to different positions about the optical axis 35 permits the object 16 to be viewed from different directions (angles of view). The off-axis sector-shaped aperture 33 of the present invention also has the effect of producing a light beam from the lens 15 to the object 16 which is oblique to the optical axis 35 of the lens 15.

Referring to FIGS. 4a, 4b and 4c, one of the advantages that accrues to a sector-shaped aperture 33 in an aperture mask 31, as taught by the present invention, is that it operates equally with an objective of low numerical aperture, as well as an objective with a high numerical aperture.

Thus, while the mask 31 is substantially larger than the low numerical aperture objective 41, the mask 31 nonetheless provides an effective aperture 33 which permits light to pass through an area of the objective 41 that includes the center and the periphery. Although the mask 31 and its apertures stay the same in size, it continues to provide an effective-sized aperture for a medium numerical aperture objective 42 (FIG. 4b) and a high numerical aperture objective 43 (FIG. 4c). Thus, in terms of what an aperture "sees," mask 31 is the same relative size for a wide range of numerical apertures.

Various mechanical and electronic devices are capable of creating a variable-size, sector-shaped aperture in an opaque mask. Referring to FIGS. 5a and 5b, in one embodiment of the invention, a ring 44 acts as a track for a plurality of stackable leaflets 46, all of which have the shape of a sector of a circle and are pinned at their vertexes 47. The leaflets 46 are opaque, and as they are spread out, they occlude more of the space within the ring 44, thereby varying the size of the open sector-shaped aperture 45.

Referring to FIG. 6, in another embodiment of the invention, an opaque expandable bellows member 49 is expanded and contracted to change the size of the sector-shaped aperture 51 in a mask 52 to provide the function described in connection with FIGS. 1–4.

Referring to FIG. 7, another embodiment of the invention is a mask 54 comprised of two opaque half-circle members 56 and 57 which rotate around a center point 59 of the mask 54 to vary the size of the sector-shaped aperture 58 formed when portions of the members 56 and 57 overlap.

Referring to FIG. 8a, yet another embodiment of the invention is a mask 61 formed by a plurality of sector-shaped LCD (liquid crystal diode) members 62 which, together, form a circle. Each LCD sector member 62 can be independently electronically controlled to either be opaque or transparent (transmit light). By selecting various combinations of the multiple sectors 62 which transmit light and those which are opaque to light, the mask 61 can create a variety of different-sized, sector-shaped, light transmissive apertures which perform the functions of the invention as described above (as illustrated in FIGS. 8b and 8c).

LCDs can also be used, as seen in FIG. 8, to form an x-y array 63 that can be controlled to form any pattern of opaque and light transmissive areas desired. Thus, a variable-size, sector-shaped aperture, such as those shown in FIG. 8, can be achieved by array 63.

In addition to enhancing the characteristics of an image of an object in an optical imaging system, such as a microscope, the present invention can also be used to create a focal plane-specific view of an object. That is to say that by using the sector-shaped aperture mask of the present invention in a manner taught herein below, the image of an object at the focal plane (image plane) can be isolated from images of the object off the focal plane. Such focal plane-specific views of an object can be used to create a three-dimensional model of an object which can be measured and viewed from any angle.

Because the sector-shaped mask aperture taught by the present invention is asymmetrically disposed with regard to the objective aperture at which it is placed, the angle at which the object is viewed in the imaging system containing the present invention is dependent on the angular position of the sector-shaped aperture.

In other words, each separate location at which the sector-shaped mask aperture can be placed creates a different angle of view of the object being imaged within the system.

The significance of the ability to change the angle of view of an object in an imaging system, such as a microscope, is that as the angle of view changes, the location of all of the elements of the object being imaged also change location within the frame of view, except for those elements that are at the focal plane (image plane). Thus, the sector-shaped mask aperture of the present invention can be used to create a number of different angled views of an object while holding the focal plane constant, and through the use of digital imaging and known computer program analyzers, those elements of the imaged object which change location as the view of the object is changed are eliminated, leaving only those elements which have not moved because they are at the focal plane. The retained focal plane elements form a focal plane-specific image of the object. By moving the focal plane to various locations within the object (e.g., by changing the microscope focus), a series of focal plane-specific views of the object are obtained and can be combined, once again using known digital and computer program techniques, to create a three-dimensional model of the object which can be viewed and measured from any angle.

Referring to FIG. 9, an object 64 shown in side view has elements 64a, 64b and 64c, where element 64a is above a focal plane 66, element 64b is at the focal plane 66 and element 64c is below the focal plane 66. A top view of object 64, which is the normal view of an object in a traditional microscope, would, as best seen in FIG. 9a, only reveal element 64a and provide no information as to its position relative to the focal plane 66.

Referring to FIGS. 9b, 9c and 9d, three different angled views of the object 64 are created by positioning the sector-shaped mask aperture of the present invention at three different angled locations about the optical axis of an objective aperture in a system imaging object 64. (See, for example, FIG. 10.) FIG. 9b is a view of object 64 as seen along the direction indicated by arrow 69 in FIG. 9; the view illustrated in FIG. 9c is that seen from the angle indicated by arrow 71 of FIG. 9; while FIG. 9d is an angled view as seen from the direction indicated by arrow 72 in FIG. 9. For purposes of the invention, it is advantageous for the different angled views to be approximately equally spaced about the axis of the objective aperture.

FIGS. 9b, 9c and 9d illustrate that those elements of object 64 that are off of the focal plane 66 change their apparent location as the view angle changes, whereas the element 64b at the focal plane 66 is seen in the same location, regardless of the view angle. By the use of known digital and computer techniques, the images of object 64 shown in FIGS. 9b, 9c and 9d can be altered by eliminating all elements of the object which appear to change location when seen from different angles of view, while retaining only those elements which remain essentially stationary. Applying that algorithm results in the focal plane-specific view of object 64, as shown in FIG. 9e, where only element 64b has been retained in the image.

A series of focal plane-specific images can be created by changing the location of the focal plane within the object, and for each different location of the focal plane, applying the algorithm to eliminate from the image all elements which appear to change location as the view angle is changed. The series of focal plane-specific images can be stacked to create a 3-D model of the object, which can then be viewed and measured from any angle.

A number of ways of using the sector-shaped mask aperture of the present invention can result in obtaining a plurality of different angled views of an object for the purpose of creating a series of focal plane-specific views of the object. One way of achieving the result is to simply rotate a sector-shaped aperture mask, as taught by the present invention, to several different locations about the optical axis of the system in which it is operating, and at each such location, capture an image of the object being viewed. This could be very conveniently and easily accomplished with the LCD embodiment of the invention, as seen in FIGS. 8 and 8a, as the light-passing sectors of the mask can be electronically changed quickly and accurately about the center of the mask.

Referring to FIG. 10, a slide member 73 contains four aperture masks, each having a sector aperture of approximately one-quarter of a circle, and each such aperture rotated 90 degrees relative to the angular position of the adjacent aperture. Thus, mask 74 has a sector-shaped aperture 76, while adjacent mask 77 has a sector-shaped aperture 78 rotated approximately 90 degrees relative to aperture 76. Similarly, mask 79 has a sector-shaped aperture 81 rotated an additional 90 degrees relative to aperture 78, while a mask 82 has a sector-shaped aperture 83 rotated 90 degrees relative to aperture 81. For convenience, an unmasked aperture 84 is provided.

In operation, a slide member 73 is disposed at an objective aperture in an imaging system in a way that allows alignment of masks 74, 77, 79 and 82 with the objective aperture. As each mask is aligned with the aperture, an image of the object is captured. In this way, four different angled views are recorded, each approximately 90 degrees apart. A comparison of the different images so captured identifies those elements of the object off the focal plane—those elements that appear to change location from one view to another. By retaining only the focal plane elements, a focal plane-specific view is achieved.

It will be clear to those skilled in the art that the size of apertures 76, 78, 81 and 83 can be varied widely from the specific apertures illustrated. At the same time, it is preferred that apertures 76, 78, 81 and 83 be all of substantially the same size so that the differences between the images seen through the several masks will differ only in the location of the elements that comprise the image.

Obviously, many modifications and variations of the present invention are possible in light of the above teachings. It will, therefore, be understood by those skilled in the art that within the scope of the appended claims, the invention may be practiced otherwise than as specifically described.

What is claimed is:

1. A variable-size mask for an objective aperture of the kind having an optical axis and a periphery comprising:
    an opaque body having a variable-size, sector-shaped aperture having a vertex wherein, when said opaque body is located at the objective aperture and said vertex is located at the optical axis, the objective aperture is occluded, except for at least a portion of the sector-shaped aperture, and said body is positionable about the optical axis to locate said sector-shaped aperture at different axial locations at the objective aperture.

2. The mask of claim 1 wherein said sector-shaped aperture extends at least to the objective aperture and said periphery when said opaque body is located at the objective aperture and said vertex is located at the optical axis.

3. The mask of claim 1 wherein said body is an array of LCDs.

4. The mask of claim 1 wherein said body is an expandable bellows.

5. The mask of claim 1 wherein said body is overlapping leaflets.

6. The mask of claim 1 wherein said body is two overlapping semi-circular opaque discs.

7. The mask of claim 1 wherein said body is a plurality of sector-shaped LCDs.

8. A method for increasing the contrast, definition and depth of field of an image in a light microscope having an objective aperture with an optical axis and a periphery without reducing resolution, the steps comprising:
    occluding the objective aperture so that part of the aperture can pass light and part cannot pass light wherein the part that can pass light extends from the optical axis to the periphery of the objective aperture; and
    varying the size of the part of the aperture that can pass light until the image has the desired contrast, definition and depth of field.

9. The method of claim 8 wherein the part that can pass light is in the shape of a sector of a circle.

10. A method of creating an image of a thin optical section of a three-dimensional object comprised of a plurality of elements viewed through a microscope having a focal plane and an objective aperture, the steps comprising:
    locating the focal plane within the object;
    occluding a portion of an objective aperture to create a first angled view of the object;
    occluding a portion of the objective aperture to create a second angled view of the object which is different than the first angled view;
    identifying those elements of the object that are at the same location in differently angled views.

11. The method of claim 10 comprising the further steps of:
    occluding a portion of the objective aperture to create a third angled view of the object which is different than both the first and second angled views;

identifying those elements of the object that are at the same location in all three angled views.

12. The method of claim 10 further comprising the step of creating a focal plane specific image from those elements of the object that are at the same location in the different angled views.

13. The method of claim 11 further comprising the step of creating a focal plane specific image from those elements of the object that are at the same location in the different angled views.

14. In a microscope for creating an image of an object and having at least one objective aperture through which a light beam passes, the improvement comprising:

a mask located at the objective aperture having an image-enhancing, variable size, sector-shaped opening, variably shaping the light beam such that only a selected size sector of the aperture passes light whereby the visual image of the object when said mask is located at the objective aperture is enhanced over an image of the object created in the same microscope absent said mask.

15. The method of claim 10 comprising the further steps of:

occluding a portion of the objective aperture to create a plurality of angled views of the object which are different than both the first and second angled views;

identifying those elements of the object that are at the same location in all of the angled views.

16. The method of claim 15 further comprising the step of creating a focal plane specific image from those elements of the object that are at the same location in the different angled views.

* * * * *